US006961349B2

(12) United States Patent
Malomsoky et al.

(10) Patent No.: US 6,961,349 B2
(45) Date of Patent: Nov. 1, 2005

(54) HANDLING TCP PROTOCOL FOR CONNECTIONS TRANSMITTED IN PARALLEL OVER RADIO LINK

(75) Inventors: Szabolcs Malomsoky, Szentendse (HU); Pal Zarandy, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 864 days.

(21) Appl. No.: 09/866,921

(22) Filed: May 30, 2001

(65) Prior Publication Data

US 2002/0196760 A1 Dec. 26, 2002

(51) Int. Cl.$^7$ .................................................. H04Q 7/24
(52) U.S. Cl. ........................ 370/469; 370/338; 370/471
(58) Field of Search ................................ 370/338, 469, 370/471, 349, 312, 331, 352–356, 389, 394, 401, 429, 465, 466, 412, 231

(56) References Cited

U.S. PATENT DOCUMENTS

| | | | | |
|---|---|---|---|---|
| 6,208,620 | B1 * | 3/2001 | Sen et al. .................... | 370/231 |
| 6,359,877 | B1 * | 3/2002 | Rathonyi et al. ........... | 370/349 |
| 6,529,525 | B1 * | 3/2003 | Pecen et al. ................ | 370/469 |
| 6,671,287 | B1 * | 12/2003 | Huttunen et al. ........... | 370/469 |
| 6,697,331 | B1 * | 2/2004 | Riihinen et al. ............ | 370/236 |
| 6,711,141 | B1 * | 3/2004 | Rinne et al. ................ | 370/328 |
| 6,816,471 | B1 * | 11/2004 | Ludwig et al. ............. | 370/331 |
| 2001/0009544 | A1 * | 7/2001 | Vanttinen et al. .......... | 370/338 |
| 2001/0017850 | A1 * | 8/2001 | Kalliokulju et al. ........ | 370/331 |
| 2002/0191556 | A1 * | 12/2002 | Krishnarajah et al. ...... | 370/329 |

FOREIGN PATENT DOCUMENTS

EP 1 148 689 A * 10/2001

OTHER PUBLICATIONS

Chen et al., "Syndrome: A Light–Weight Approach to Improving TCP Performance in Mobile Wireless Networks", Wireless Communications and Mobile Computing, vol. 2, No. 1, Feb. 2002, pp. 37–57.*
International Search Report mailed Sep. 6, 2002.*
3GPP TS 25.322 V3.5.0 (200–12), 3$^{rd}$ Generation Partnership Project; Technical Specification Group Radio Access Network; RLC Protocol Specification (Release 1999).
3GPP TS 25.331 V3.5.0, 3$^{rd}$ Generation Partnership Project; Technical Specification Group Radio Access Network; RRC Protocol Specification (Release 1999).
W.R. Stevens, *TCP/IP Illustrated, vol. I: The Protocols*; chapters 19–21, pp. 263–316, (Addison–Wesley, 1994).
International Preliminary Examination Report mailed Jan. 8, 2003 in corresponding PCT Application No. PCT/SE02/01006.

* cited by examiner

*Primary Examiner*—Ajit Patel
*Assistant Examiner*—Chirag Shah
(74) *Attorney, Agent, or Firm*—Nixon & Vanderhye, P.C.

(57) ABSTRACT

The radio link control (RLC) entity uses availability of Internet Protocol (IP) packets for a given TCP connection to control separately for the given TCP connection in-sequence delivery to an Internet Protocol layer of Internet Protocol (IP) packets without regard to availability of Internet Protocol (IP) packets of another of the plural TCP connections. The radio link control (RLC) entity has both a sending side (which sends RLC PDUs to the lower level medium access control (MAC) layer) and a receiving side (which receives RLC PDUs from the lower level medium access control (MAC) layer). To control in-sequence delivery of the Internet Protocol (IP) packets for the given TCP connection, the radio link control (RLC) entity inserts and uses port-specific sequence numbers in the RLC protocol data units which carry the Internet Protocol (IP) packets for the given TCP connection.

49 Claims, 9 Drawing Sheets

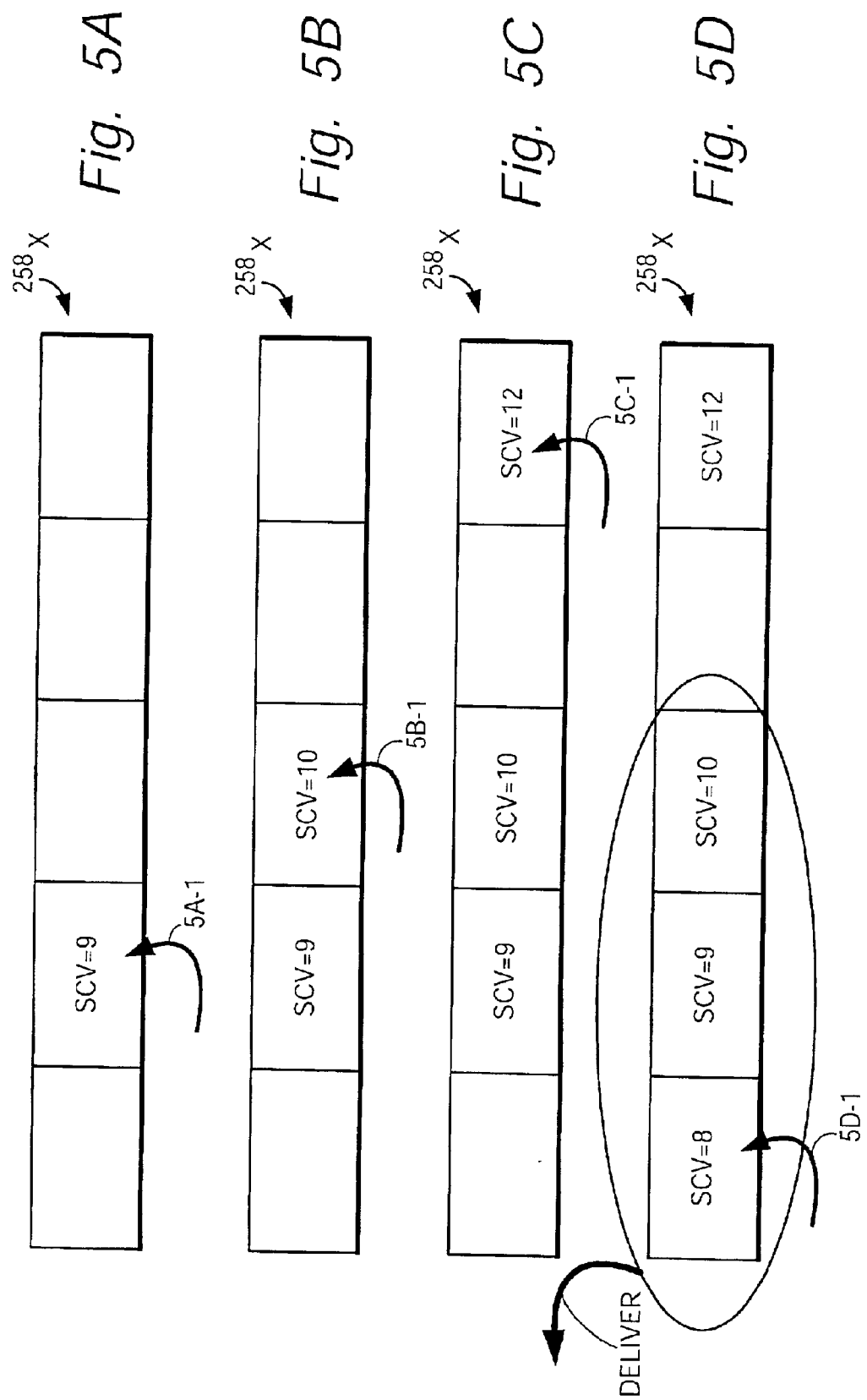

US 6,961,349 B2

HANDLING TCP PROTOCOL FOR CONNECTIONS TRANSMITTED IN PARALLEL OVER RADIO LINK

BACKGROUND

1. Field of the Invention

The present invention pertains to wireless telecommunications, and particularly to handling TCP/IP connections which are transmitted over an air interface (e.g., radio link).

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. A project known as the Third Generation Partnership Project (3GPP) has undertaken to evolve further the UTRAN and Global System for Mobile communications (GSM)-based radio access network technologies.

UTRAN is essentially a radio access network providing wideband code division multiple access (WCDMA) to user equipment units (UEs). As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". An interface between radio network controllers (e.g., between a Serving RNC [SRNC] and a Drift RNC [DRNC]) is termed the "Iur" interface.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks).

As indicated above, packet switched data services can include Internet service. In terms of Internet connection, the transmission control protocol/Internet protocol (TCP/IP) has gained wide acceptance. Although usually functioning together, the internet protocol (IP) and transmission control protocol (TCP) are actually separate protocols, with the TCP being on a higher level (transport level) than the IP (on the network level). General concepts undergirding TCP/IP are understood from numerous publications, including Freeman, *Telecommunication System Engineering*, Third Edition, John Wiley & Sons, Inc., (1996), and W. R. Stevens, *TCP/IP Illustrated, Volume I: The Protocols* (Addison-Wesley, 1994).

In the Universal Mobile Telecommunications System (UMTS), a Radio Link Control (RLC) layer with its RLC protocol is interposed between a layer such as the Internet Protocol (IP) Layer and the Medium Access Control (MAC) layer. Radio link control (RLC) is a protocol layer that has various uses. The radio link control (RLC) has several modes of operation, including the transparent mode, the unacknowledged mode, and the acknowledged mode (AM). The mode of operation is selected according to the requirements of the higher layer. The radio link control (RLC) is used both for data flows and also for signaling flows.

FIG. 1 shows a Radio Link Control (RLC) layer 100 which transmits RLC PDUs (Protocol Data Units) to, and receives RLC PDUs from, the Medium Access Control (MAC) layer 102. In FIG. 1, the Medium Access Control (MAC) layer 102 functions as the "lower layer" relative to the RLC layer, while a TCP/IP layer 104 (e.g., IP layer) functions as the "higher layer". The Medium Access Control (MAC) layer 102 is responsible, e.g., for mapping between logical channels and transport channels, priority handling, and scheduling of data flows on transport channels.

As shown in FIG. 1, an RLC entity 110-UE is provided in a user equipment unit (UE) and a RLC entity 110-RAN is provided in the UTRAN. With respect to the lower layer (e.g., Medium Access Control (MAC) layer 102), each RLC entity 110 has a transmitting side and a receiving side. With its RLC PDUs, the RLC protocol of the Radio Link Control (RLC) layer supports the in-sequence delivery of higher level Service Data Units (SDUs), which in the illustration of FIG. 1 are TCP/IP IP packets. The Radio Link Control (RLC) layer is described in more detail in 3GPP TS 25.322 V3.5.0 (200-12)$3^{rd}$ Generation Partnership Project; Technical Specification Group Radio Access Network; RLC Protocol Specification (Release 1999).

Data losses because of bit errors occur over conventional wired links, but such losses are so small as to be essentially non-existent (e.g., on the order of $10^{-6}$ over copper wire, and $10^{-9}$ over optical fiber). Such losses over conventional wired links stem almost exclusively from overflowing buffers in routers. TCP is designed to cope with these conditions, and consequently, packet losses are regarded as a congested network. Upon detection of loss, different implementations of TCP invoke different congestion avoidance mechanisms, but generally all such congestion avoidance mechanisms decrease the transmission speed.

Some limited code-type error recovery capability (e.g., convolutional coding) is provided over the air interface (i.e., radio interface). Over the air interface, such error recovery is performed locally with a local retransmission protocol, wherein all data in a transmission buffer is cached until it has been successfully delivered. In this regard, for example, the Radio Link Control (RLC) protocol of the Radio Link Control (RLC) layer has its local retransmission protocol—the Automatic Repeat Request (ARQ) protocol. The Automatic Repeat Request (ARQ) protocol of the RLC layer is used, e.g., to hide the stochastic block errors on the radio interface from the congestion avoidance algorithm of the TCP. In essence, using the ARQ retransmission protocol of the RLC layer, any lost data is quickly transmitted before TCP has a chance to detect the loss. By retransmitting the data locally (e.g., using the ARQ), faster recovery can be done and, most importantly, the TCP will not detect the loss and accordingly will not invoke the TCP congestion avoidance mechanism (unless data is lost somewhere other than over the air interface).

The consequence of the foregoing is that the loss rate of the Internet Protocol (IP) packets of TCP will be practically zero within the mobile access network. However, the TCP protocol will perceive variable packet delay depending on the conditions of the network (e.g., the loss rate of the RLC PDUs over the radio interface).

The third generation mobile networks seek generally to provide high birate for many types of applications. A typical example is the 384 kbit/sec bearer for best-effort (TCP) traffic. In a simulation concerning end-to-end performance of TCP over such a link, the average application level throughput (especially in the case of short files) was found to be far less than the physical level bit rate dedicated to the connection. This was primarily attributable to the relatively high delay IP packets suffer due to the acknowledging mechanism (e.g., ARQ) of the RLC. The control mechanism of TCP cannot work fast enough when it is probing the available bandwidth of the path. This leads to poor utilization of the radio bearer. Furthermore, increasing the bitrate of the bearer does not lead to improvement on the application level. Therefore, in this situation the only efficient means for improving the application level throughput is to lower the IP packet transaction delay.

The in-sequence delivery of TCP/IP IP packets, mentioned above, is important for the correct operation of TCP. The original order of the IP packets is determined on the receiving side of a RLC entity using the sequence numbers of the RLC PDUs and length indicator (LI) fields included in the RLC PDUs. The length indicator fields are employed, e.g., for making the SDU (e.g., TCP/IP IP packet) boundaries within the as RLC PDUs. The in-sequence delivery becomes even more important as the bitrate of the radio bearer increases, as (for example) in the case of the 384 kbit/sec bearer described above. With such radio bearer, one or more RLC PDUs carrying an IP packet can seem lost as RLC PDUs carrying subsequent IP packets arrive correctly. In this case, if the bitrate of the radio bearer is high and the round trip time (RTT) of the RLC PDUs is also high, many correctly arriving IP Packets can be blocked in the receiver's buffer because of a lost PDU belonging to an earlier IP packet. If the RTT is short compared to the transmission bandwidth, only a few IP packets can accumulate in the receiver.

In view of the foregoing, to avoid malfunction of the higher layers (e.g., the TCP/IP layer 104 in FIG. 1), even if an IP packet has completely arrived at the receiver side of the RLC entity, the RLC entity will not deliver the completely arrived IP packet to the higher layer (TCP/IP) unless all of the predecessor IP packets have already been delivered. Thus, the price of this in-sequence delivery is that the average delay in delivery of the IP packets increases significantly. In the case of one TCP connection over the RLC, the delay required to accommodate the in-sequence delivery occasions less performance degradation than would otherwise be experience by out-of-sequence delivery. However, this may not be the case in situations in which several TCP connections of one subscriber [e.g., one user of a user equipment unit (UE)] are operating over the RLC entity.

Recent investigations of Internet traffic reveal that Hypertext Transfer Protocol (HTTP)/1.0 is the most widely used transfer protocol for web browsing. A typical characteristic of Hypertext Transfer Protocol (HTTP)/1.0 is that it opens a new TCP connection for each embedded object (e.g., image) on a web page. Thus, a subscriber using Hypertext Transfer Protocol (HTTP)/1.0 to obtain a web page likely has several TCP connections extant when receiving the web page. The number of TCP connections can proliferate in the typical scenario in which a web user has open more than one web page at a time, e.g., as the user reads one web page while one or more other web pages are being download.

A buffer blocking problem is presented by the confluence of in-sequence delivery and the existence of multiple TCP connections. Conventionally, IP packets belonging to all of the multiple TCP connections are stored in a same RLC transmission is buffer. According to current specifications, it may easily occur that, due to one or more lost RLC PDUs belonging to a certain TCP connection, some other IP packets, belonging to other TCP connections, are blocked from delivery out of the common RLC transmission buffer (even though those other IP packets are in-sequence within their respective connections). This causes extra delay in the end-to-end IP packet transaction, and thus can significantly degrade TCP performance.

What is needed, therefore, and an object of the present invention, is a more efficient technique for providing in-sequence delivery of IP packets when plural TCP connections are opened by a subscriber.

BRIEF SUMMARY OF THE INVENTION

A radio link control (RLC) entity supports plural TCP connections across a radio interface and is employed with or in a radio access network. The radio link control (RLC) entity processes RLC protocol data units (PDUs) obtained from a medium access control (MAC) layer to obtain Internet Protocol (IP) packets for the plural TCP connections. The radio link control (RLC) entity uses availability of Internet Protocol (IP) packets for a given TCP connection to control separately for the given TCP connection in-sequence delivery to an Internet Protocol layer of Internet Protocol (IP) packets without regard to availability of Internet Protocol (IP) packets of another of the plural TCP connections. The radio link control (RLC) entity has both a sending side (which sends RLC PDUs to the lower level medium access control (MAC) layer) and a receiving side (which receives RLC PDUs from the lower level medium access control (MAC) layer).

To control in-sequence delivery of the Internet Protocol (IP) packets for the given TCP connection, the radio link control (RLC) entity inserts and uses port-specific sequence numbers in the RLC protocol data units which carry the Internet Protocol (IP) packets for the given TCP connection. The port-specific sequence numbers for the RLC protocol data units are assigned on a sending side of the radio link control (RLC) entity. The port-specific sequence numbers are carried in an extension of a length indicator field of a header of the RLC protocol data units. A predetermined value in a header extension type field of the header of the RLC protocol data units indicates that the port-specific sequence numbers are carried in an extension of a length indicator field of the header of the RLC protocol data units.

On its receiving side, the radio link control (RLC) entity maintains a differentiated buffering technique for the plural TCP connections. The differentiated buffering technique involves differentiating between Internet Protocol (IP) packets in accordance with TCP port identifiers carried in the Internet Protocol (IP) packets to form TCP-specific subsets of Internet Protocol (IP) packets. The differentiated buffering technique further involves storing the TCP-specific subsets of Internet Protocol (IP) packets of the plural TCP connections in respective ones of the plural buffers. Within each TCP-specific subset the radio link control (RLC) entity orders the Internet Protocol (IP) packets in accordance with the port-specific sequence numbers carried in the RLC protocol data units. For the given TCP connection, the radio link control (RLC) entity delivers to the Internet Protocol (IP) layer Internet Protocol (IP) packets belonging to the given TCP connection which become in-sequence upon arrival of a most recent Internet Protocol (IP) packet belonging to the given TCP connection.

On its sending side, and upon obtaining a received Internet Protocol (IP) packet from the Internet Protocol layer for the given TCP connection, the radio link control (RLC) entity updates a port-specific sequence number counter associated with the given TCP connection and includes an updated value of the port-specific sequence number counter along with the received Internet Protocol (IP) packet in a RLC protocol data unit prepared by the radio link control (RLC) entity for transmission to the medium access control (MAC) layer. The updated value of the port-specific sequence number counter is carried in the extension of a length indicator field of a header of the RLC protocol data units.

Ordinarily, radio link control (RLC) entities are paired in operation, with one radio link control (RLC) entity being situated in a node of the radio access network and another radio link control (RLC) entity being situated in a user equipment unit (UE) which communicates across the radio interface with a node of the radio access network. In one illustrated embodiment, the node of the radio access network in which the entity resides is a radio network control (RNC) node of the radio access network.

The invention thus concerns the radio link control (RLC) entity, as employed either in a radio access network or in a user equipment unit (UE), as well as radio access networks utilizing such radio link control (RLC) entities and methods of operating such radio access networks.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 5A–FIG. 5D are diagrammatic views showing various stages of storing and retrieving Internet Protocol (IP) packets from a port reordering buffer of the radio link control (RLC) entity of FIG. 2.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
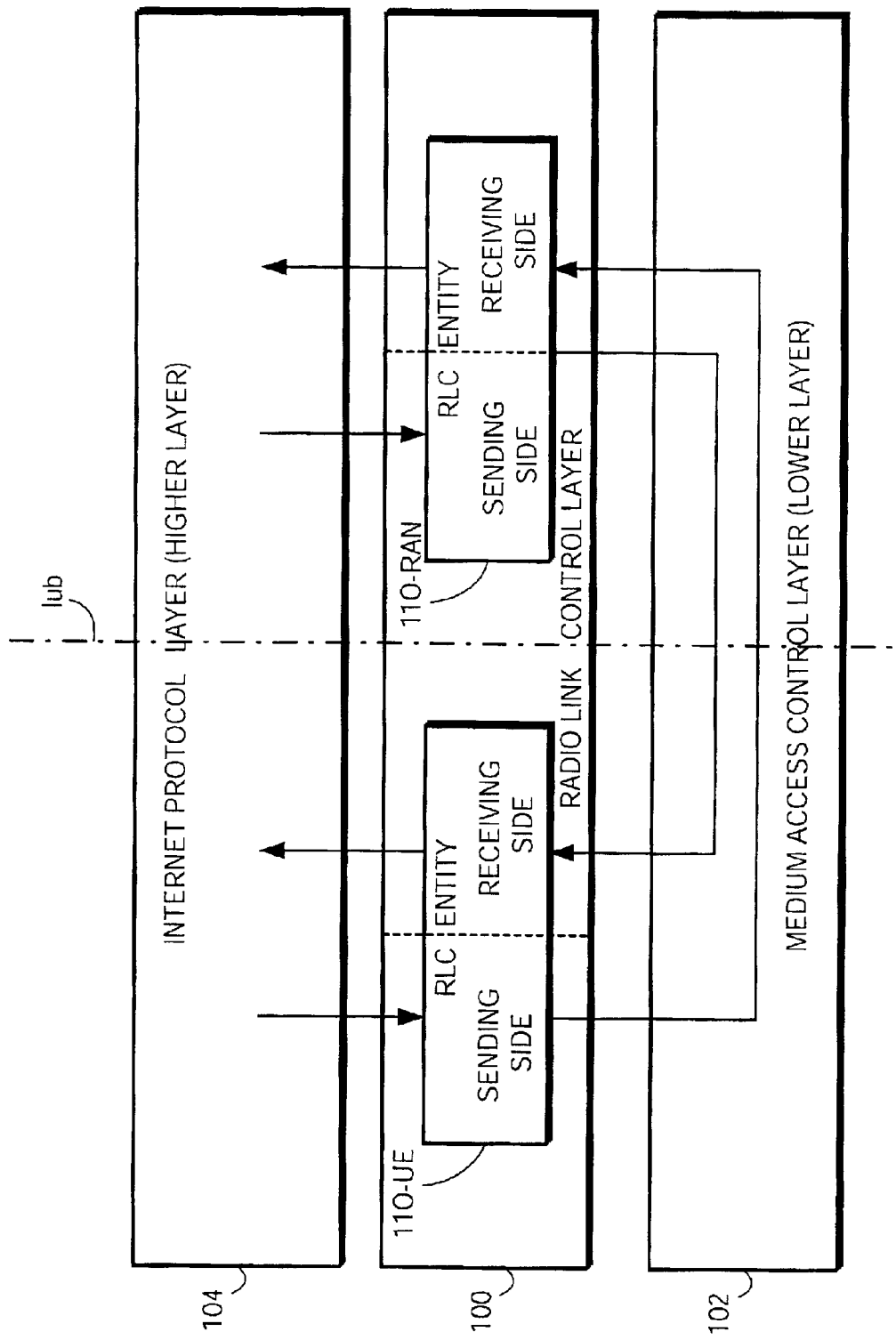
FIG. 1 is diagrammatic view of a telecommunications layer model and particularly showing a radio link control layer with two radio link control (RLC) entities situated between an Internet Protocol (IP) layer and a medium access layer (MAC).
Figure 2:
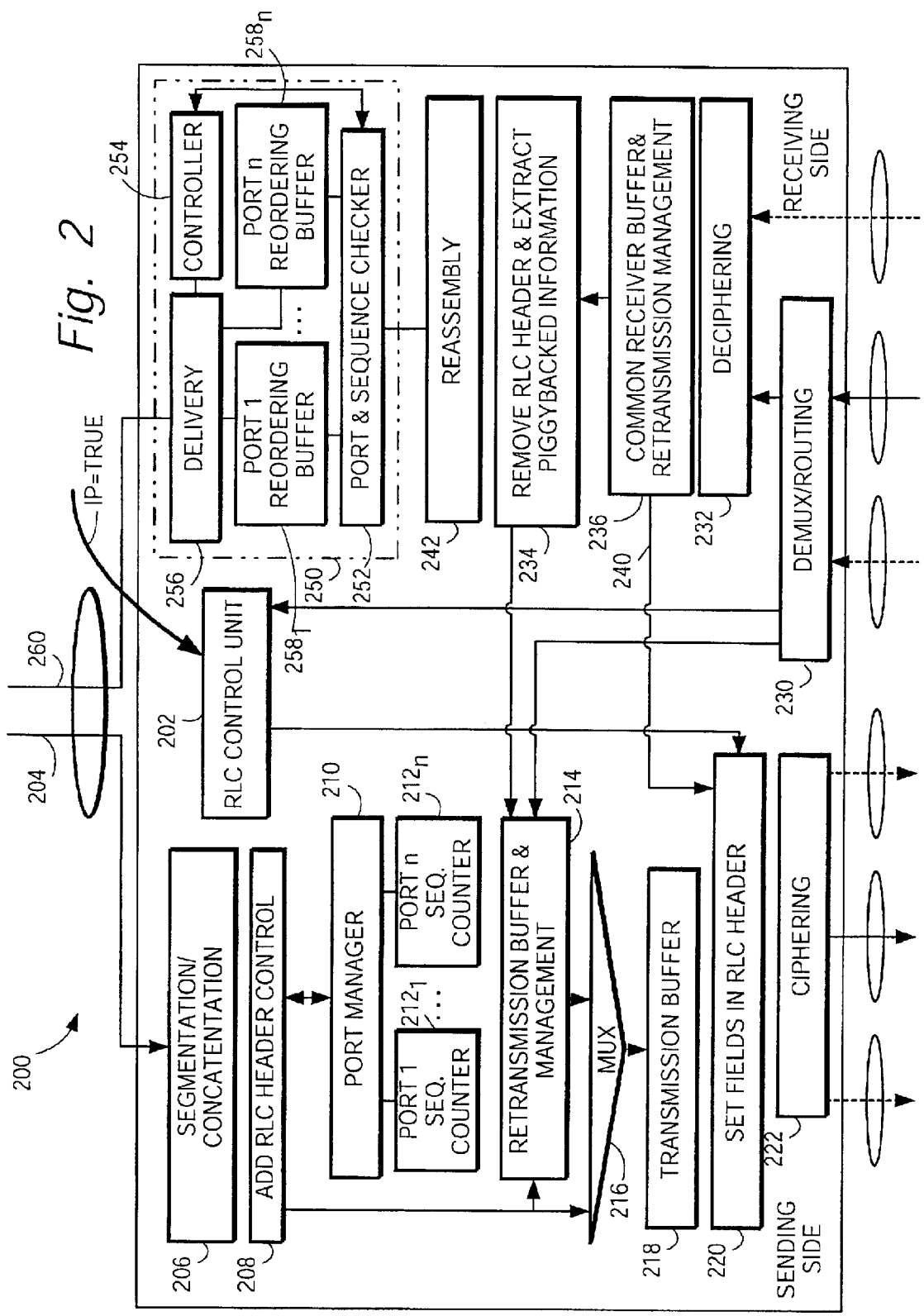
FIG. 2 is partially schematic, partially diagrammatic view of example radio link control (RLC) entity of an embodiment of the present invention.

FIG. 2 shows an example radio link control (RLC) entity 200 of a representative, non-limiting embodiment of the present invention. The radio link control (RLC) entity 200 supports one or more TCP connections established between a mobile subscriber (e.g., a user equipment unit (UE) or mobile terminal) and a radio access network (RAN). In a manner understood from FIG. 1, radio link control (RLC) entity 200 receives service data units (SDUs) from a higher layer protocol and maps those SDUs into protocol data units (PDUs) of the RLC layer. In general, "service data unit (SDU)" refers to a data unit (packet) that are delivered by a higher layer.

In the context of the present invention, the higher layer is an Internet Protocol (IP) layer which delivers IP packets to the RLC entity 200. At bearer setup, the radio resource control (RRC) has indicated to radio link control (RLC) entity 200 that the higher layer is an Internet Protocol (IP) layer, and therefore that radio link control (RLC) entity 200 is to receive Internet Protocol (IP) packets from the higher layer. One proposed framework for radio resource control (RRC) is described generally in 3GPP TS 25.331 V3.5.0, $3^{rd}$ Generation Partnership Project; Technical Specification Group Radio Access Network; RRC Protocol Specification (Release 1999), which is incorporated herein by reference [see, e.g., chapters 8.2.2, 8.6.4.3, and 10.3.4.1].

Notification regarding the nature of the higher layer enables the radio link control (RLC) entity 200 to acquire accurately the port number of the SDU of the higher layer protocol. The radio link control (RLC) entity 200 can be utilized in conjunction with various higher layer protocols, so notification of precisely which protocol resides at the higher layer to RLC is important. Such notification can occur in diverse ways, such as (for example) a field included in or added to a Downlink RLC Status Info information element employed at radio bearer establishment. For example, such field can provide a "true" value to indicate that the higher layer has IP traffic. In view of such notification that the higher layer has IP traffic, the radio link control (RLC) entity 200 treats IP packets received from the higher layer (e.g., Internet Protocol (IP) layer 104 in FIG. 1) as SDUs. Thus, in view of the notification that IP traffic is to be received from the higher layer, hereinafter (unless otherwise evident from the context) SDU and IP are used essentially interchangeably.

In the mapping of SDUs into protocol data units (PDUs) of the RLC layer, the radio link control (RLC) entity 200 might segment the SDUs (i.e., the received IP packets) into RLC PDUs of appropriate size. An SDU can also be concatenated with other SDUs for mapping into a RLC PDU. The radio link control (RLC) entity 200 delivers its RLC PDUs to the medium access control (MAC) layer.

The radio link control (RLC) entity 200 of the present invention is especially advantageous when handling plural TCP connections in which a user equipment unit (UE) participates. As explained previously, plural TCP connections can exist, for example, when a web page fetched by a browser has plural objects (corresponding to plural images), or when plural web pages are being accessed. In particular, the radio link control (RLC) entity 200 of the present invention avoids the prior art buffer blocking problem which can occur when attempting to provide in-sequence delivery in a scenario of multiple TCP connections. In this regard, and as explained in more detail hereinafter, a receiving side of the radio link control (RLC) entity 200 processes RLC protocol data units (PDUs) obtained from a medium access control (MAC) layer to obtain Internet Protocol (IP) packets for the plural TCP connections. The radio link control (RLC) entity uses availability of Internet Protocol (IP) packets for a given TCP connection to control (separately for the given TCP connection) in-sequence delivery of Internet Protocol (IP) packets (to the Internet Protocol layer) without regard to availability of Internet Protocol (IP) packets of another of the plural TCP connections.

The aspects of radio link control (RLC) entity 200 shown in FIG. 2 are for an acknowledged mode (as opposed to the unacknowledged mode or the transparent mode). As shown in FIG. 2, radio link control (RLC) entity 200 has both a sending side (which sends or transmits RLC PDUs to the lower level medium access control (MAC) layer) and a receiving side (which receives RLC PDUs from the lower level medium access control (MAC) layer). Both the sending side and the receiving side are governed and supervised by a RLC control unit 202.

FIG. 2 shows that radio link control (RLC) entity 200 can be employed in either of two scenarios. A first scenario employs one logical channel (shown as a solid line leaving the radio link control (RLC) entity 200 for the lower layer and as a solid line entering the radio link control (RLC) entity 200 from the lower layer). A second scenario employs two logical channels (shown as two dashed lines leaving the radio link control (RLC) entity 200 for the lower layer and as two dashed lines entering the radio link control (RLC) entity 200 from the lower layer). As is understood by the person skilled in the art, in the second scenario the first logical channel is used for data PDUs while the second logical channel is used for control PDUs. The logical channels actually employed in these scenarios are DCCH/DTCH.

Functions associated with the sending side of radio link control (RLC) entity 200 are shown on the left hand side of FIG. 2. Line 204 depicts the sending side of radio link control (RLC) entity 200 receiving SDUs from the higher layer(s). Recall that the radio link control (RLC) entity 200 treats IP packets obtained from the higher layer (IP layer 104) as SDUs. As indicated by block 206, the SDUs are segmented and/or concatenated to form payload units (PUs) of fixed length. If several SDUs fit into one payload unit (PU), those SDUs are concatenated and the appropriate length indicators are inserted into the beginning of the payload unit (PU). One payload unit is included in one RLC PDU.

As reflected by block 208, a RLC header is generated for each RLC PDU. In accordance with the present invention, radio link control (RLC) entity 200 has a port manager 210 which works in conjunction with the add RLC header control 208. The port manager 210 supervises (e.g., initializes, increments, and resets) a set of port-specific sequence counters illustrated in FIG. 2 as port-specific sequence counter $212_1$, through $212_n$. As explained subsequently (e.g., with reference to FIG. 4A), each port-specific sequence counter is used to count the number of IP packets received for an associated one of the plural TCP connections being handled by radio link control (RLC) entity 200. After header generation for the RLC PDU, it is placed in a retransmission buffer as indicated by block 214.

Multiplexer (MUX) 216 on the sending side of radio link control (RLC) entity 200 decides which RLC PDUs are to be submitted to the lower layer, and when those RLC PDUs are to be submitted. The RLC PDUs are multiplexed by MUX 216 into transmission buffer 218, and are then submitted by a function (represented by block 220) which completes the RLC PDU header (and which potentially replaces padding with piggybacked status information). As depicted by block 222, ciphering is applied prior to transmission of the RLC PDU to the lower layer.

The receiving side of radio link control (RLC) entity 200 receives RLC PDUs through an appropriate one(s) of the logical channels from the MAC layer. The receiving side includes a demultiplexing (DEMUX)/routing function represented by block 230. Deciphering is performed as indicated by block 232. As indicated by block 234, the RLC PDUs are expanded into separate payload units and potential piggy backed status information is extracted. The payload units are initially held in common receiver buffer 236 until a complete SDU (e.g., a complete IP packet) has been received. When necessary, the control element for the common receiver buffer 236 requests retransmissions of payload units by sending negative acknowledgements to a peer radio link control (RLC) entity (by a signal depicted by line 240). After RLC PDU headers are removed at block 234, and after all segments of an IP packet as carried by one or more RLC PDUs are received, the completed IP packet is reassembled by reassembly block 242.

Delivery of the completed IP packets which are formed in reassembly unit 242 is supervised by an inventive per-connection delivery organizer 250 of the present invention. The per-connection delivery organizer 250 is framed by a dashed/double-dotted line in FIG. 2 and comprises a port & sequence checker unit 252; a per-connection delivery organizer controller 254 which controls a SDU delivery function 256; and plural port reordering buffers 258. The port reordering buffers 258 are accessed by delivery function 256 but are controlled by controller 254. In FIG. 2 the port reordering buffers 258 are shown as including port reordering buffer $258_1$ through port reordering buffer $258_n$. As explained subsequently (e.g., with reference to FIG. 4B), each of the port reordering buffers 258 is associated with one of the plural TCP connections being handled by radio link control (RLC) entity 200. At any given moment, the number of port reordering buffers 258 of the receiving side essentially corresponds to the number of port-specific sequence counters 212 which are active on the sending side of radio link control (RLC) entity 200. The in-sequence delivery of IP packets for the plural TCP connections handled by radio link control (RLC) entity 200 is effected by delivery function 256 to the higher layer as indicated by line 260 in FIG. 2.

Other aspects of the structure and operation of radio link control (RLC) entity 200 not herein described are understood from 3GPP TS 25.322 V3.5.0 (200-12),$3^{rd}$ Generation Partnership Project; Technical Specification Group Radio Access Network; RLC Protocol Specification (Release 1999) to the extent that such specification is not inconsistent with the inventive concepts described herein.

Figure 4A:
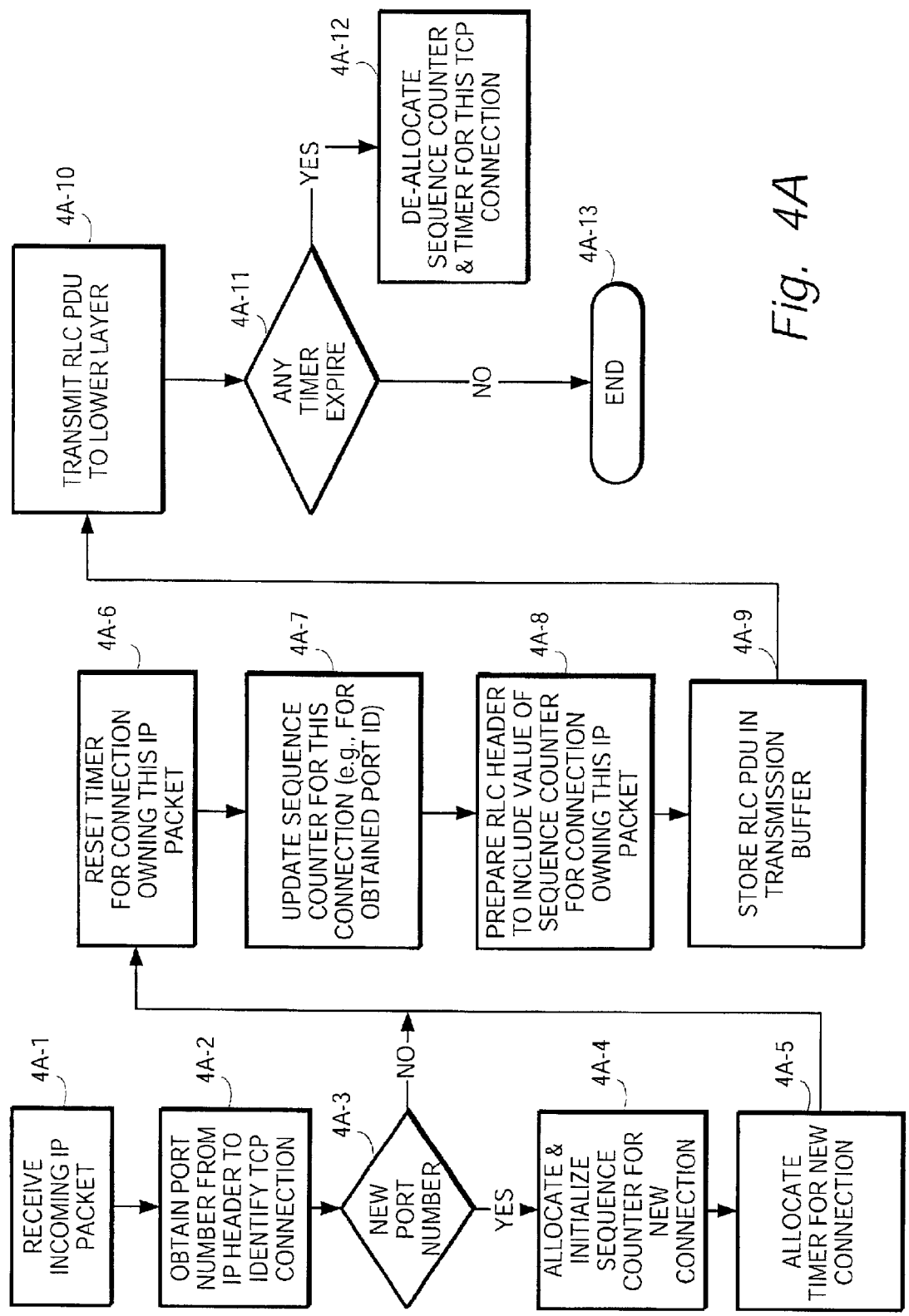
FIG. 4A is a flowchart showing certain basic example steps performed by a sending side of the radio link control (RLC) entity of FIG. 2.
Figure 4B:
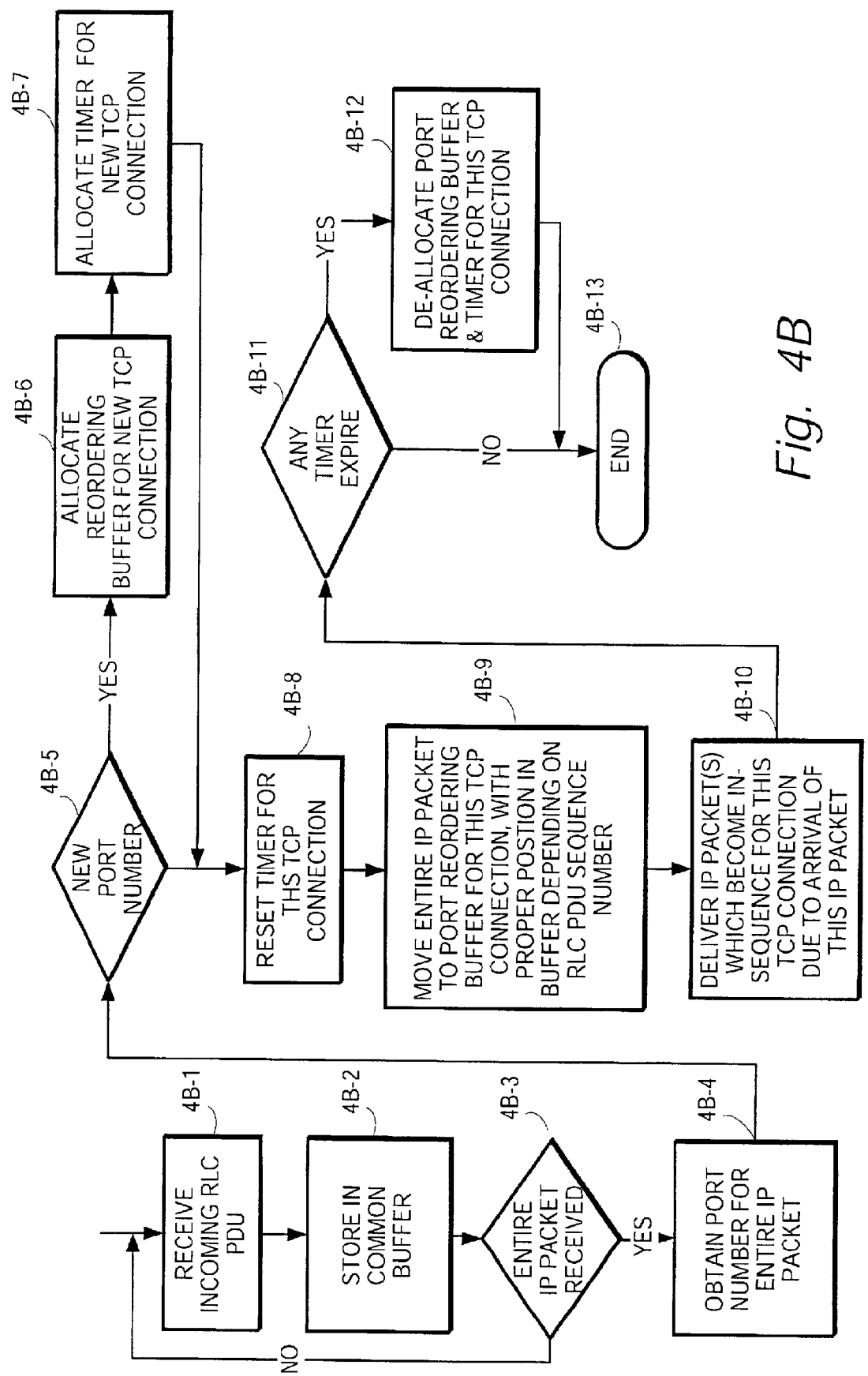
FIG. 4B is a flowchart showing certain basic example steps performed by a receiving side of the radio link control (RLC) entity of FIG. 2.

Operation of the radio link control (RLC) entity 200 of the present invention is understood with reference to the basic steps shown in FIG. 4A and FIG. 4B. As explained in more detail with reference to FIG. 4A and FIG. 4B, to control in-sequence delivery of the Internet Protocol (IP) packets for a particular TCP connection, the radio link control (RLC) entity inserts and uses port-specific sequence numbers in the RLC protocol data units which carry the Internet Protocol (IP) packets for the that particular TCP connection.

The port-specific sequence numbers for the RLC protocol data units are assigned on the sending side of the radio link control (RLC) entity, an example manner of the assignment being illustrated by the basic steps of FIG. 4A. FIG. 4A depicts, as step 4A-1, the sending side of radio link control (RLC) entity 200 receiving on line 204 an incoming service data unit (SDU) from the higher layer.

In the illustrated context, on its sending side the radio link control (RLC) entity 200 treats an IP packet received from higher layer (Internet Protocol (IP) layer 104) as a SDU. Such treatment results from the radio link control (RLC) entity 200 having received an indication at bearer setup from the radio resource control (RRC) that the higher layer is an Internet Protocol (IP) layer, and therefore that radio link control (RLC) entity 200 is to receive Internet Protocol (IP) packets from the higher layer. As explained previously, one example way that this indication can occur is in a field of a Downlink RLC Status Info information element employed at radio bearer establishment. For example, a field can be added to the Downlink RLC Status Info information element to provide a "true" value to indicate that the higher layer has IP traffic. Receipt of an indication that the higher layer is an IP layer, and that IP packets are received from the IP layer, is simply illustrated in FIG. 2 as an arrow "IP=true" applied to RLC control unit 202.

An IP packet, treated by radio link control (RLC) entity 200 as an SDU, is received by segmentation/concatenation unit 206, which segments and/or concatenates the SDU to form payload units (PUs) of fixed length. Each Internet Protocol (IP) packet includes a header which contains, e.g., a port number associated with the TCP connection to which the IP packet belongs. As step 4A-2, the add RLC header control function 208 obtains the port number associated with the TCP connection from the IP header of the just-received IP packet. The add RLC header control function 208 then requests the port manager 210 to check, as step 4A-3, whether the port number obtained at step 4A-2 is a new port number (and thereby ascertaining whether a new TCP connection has just been instigated).

In the event that a new port number is detected by port manager 210 at step 4A-3, as step 4A-4 the port manager 210 allocates and initializes a sequence counter for the new TCP connection. In this regard, the port manager 210 controls the set of port-specific sequence counters 212, and can assign an available one of the port-specific sequence counters 212 to the new TCP connection. In addition, as step 4A-5, the port manager 210 allocates a timer for the new TCP connection. Therefore, each TCP connection has a port-specific sequence counter 212 and a timer. As explained subsequently, the timer is utilized essentially to ascertain termination of a TCP connection (e.g., upon time out of the timer the TCP connection is presumed terminated).

After making a negative determination at step 4A-3 or after performing step 4A-5, as step 4A-6 the port manager 210 resets the timer for the TCP connection which owns the most recently received IP packet. As step 4A-7, the port manager 210 updates or increments the port-specific sequence counter for this connection. The port manager 210 then apprises add RLC header control function 208 of the value of the port-specific sequence counter for this connection. This permits the add RLC header control function 208, as step 4A-8, to include the value of the port-specific sequence counter for this connection in an RLC PDU header which add RLC header control function 208 is preparing. An example of how the add RLC header control function 208 includes the value of the port-specific sequence counter for this connection in an RLC PDU header is described below in conjunction with FIG. 3 and FIG. 3A.

Amid other operations, as step 4A-9 the RLC PDU whose header was prepared at step 4A-8 is stored in transmission buffer 218. Eventually, after other standard operations (such as ciphering), as step 4A-10 the RLC PDU is transmitted over the appropriate logical channel(s) to the lower layer (e.g., MAC layer 102 illustrated in FIG. 1).

As depicted generally in FIG. 4A, as step 4A-11 the sending side of radio link control (RLC) entity 200 periodically checks whether any of the timers set for the corresponding TCP connections have timed out. Such a time out presumptively indicates that the TCP connection has been terminated. In case any timer associated with the TCP connections has expired, as step 4A-12 the particular port-specific sequence counter 212 and timer associated with that presumptively terminated TCP connection are de-allocated (and the timer previously assigned for that TCP connection is reset). Symbol 4A-13 depicts completion of basic operations of the sending side of radio link control (RLC) entity 200 relative to receipt of an IP packet from the higher layer and transmission of a RLC PDU including that IP packet to the lower layer.

Thus, from the foregoing it is understood that, on its sending side, and upon obtaining a received Internet Protocol (IP) packet from the Internet Protocol layer for the given TCP connection, the radio link control (RLC) entity 200 updates a port-specific sequence number counter 212 associated with the given TCP connection and includes an updated value of the port-specific sequence number counter along with the received Internet Protocol (IP) packet in a RLC protocol data unit prepared by radio link control (RLC) entity 200 for transmission to the medium access control (MAC) layer. The updated value of the port-specific sequence number counter is carried in the extension of the length indicator (LI) field of a header of the RLC protocol data units.

Figures 3, 3A:
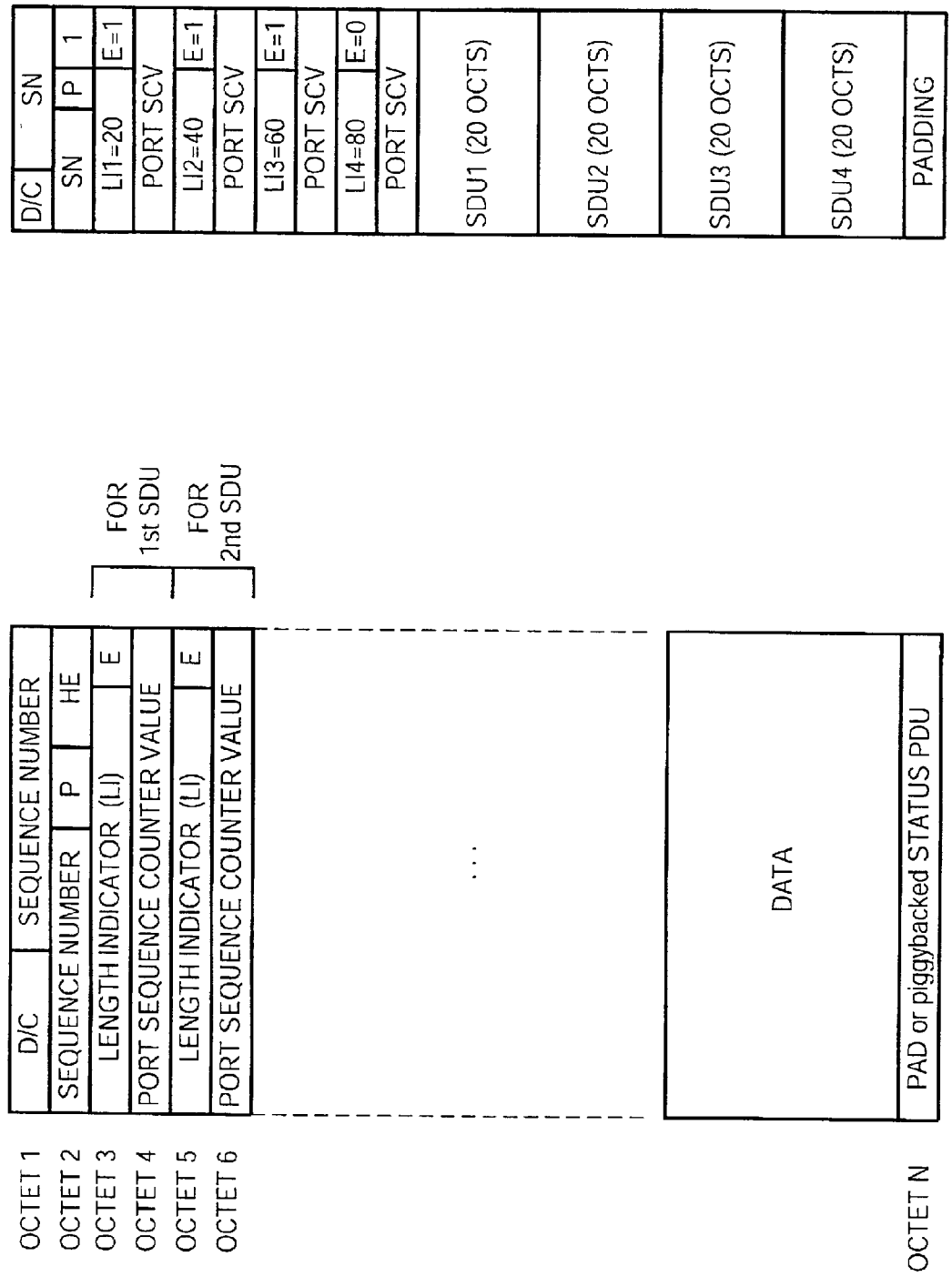
FIG. 3 is diagrammatic view of an example format of a radio link control (RLC) protocol data unit (PDU) prepared and/or processed by the radio link control (RLC) entity of FIG. 2.
FIG. 3A is diagrammatic view of example contents of a radio link control (RLC) protocol data unit (PDU) having the format of FIG. 3

FIG. 3 together with FIG. 3A illustrates one example manner of how the add RLC header control function 208 can include the value of the port-specific sequence counter for in an RLC PDU header. FIG. 3 illustrates the format of a RLC PDU in accordance with the present invention, shown as having N number of octets. The first octet of the RLC PDU includes a D/C field (one bit), which is used to indicate whether this acknowledged mode PDU is a data PDU or a control PDU. The remainder of the first octet of the PDU and all but the last three bits of the second octet, contain the payload unit (PU) sequence number (SN), encoded in binary. The second octet of the PDU also includes a polling bit P (used to request a status report), and a two bit Header Extension Type (HE) field.

In the particular PDU illustrated in FIG. 3, the third octet and the fourth octet form an octet pair which is associated with a first possible SDU included in this RLC PDU. Similarly, the fifth octet and the sixth octet form an octet pair which is associated with a second possible SDU included in this RLC PDU. The SDUs included in the RLC PDU are situated after the last octet pair (e.g., in a payload or "DATA" region of the SDU). All contents of the PDU prior to the payload or "DATA" region constitute the header of the RLC PDU.

In each octet pair of the header, the first octet of the pair comprises a seven bit length indicator (LI) field and a one bit extension (E) field while the second octet pair comprises the port-specific sequence count value (PORT SCV) obtained at step 4A-3 and stored at step 4A-8 for the TCP connection which contributed the SDU (e.g., IP packet) carried in the portion of the PDU payload corresponding to this octet pair. For example, for a first SDU included in the RLC PDU of FIG. 3, the third octet of the PDU includes the length indicator (LI) field and the extension (E) field, while fourth octet of the PDU carries the port-specific sequence count value (PORT SCV).

The length indicator (LI) field points out the number of octets between the end of the last length indicator (LI) field and up to and including the octet at the end of the associated SDU. In other words, the length indicator (LI) field points out the number of octets from the end of the PDU header to the end of the associated SDU. The E field bit indicates whether the octet following the octet pair will be an octet pair for another PDU, or whether the payload of the PDU begins after this octet pair.

The RLC PDU of the present invention thus differs from the prior art by carrying the port-specific sequence number associated with a SDU (e.g., IP Packet) in an extension of the length indicator (LI) field associated with that SDU. In other respects not inconsistent with the present invention, the RLC PDU and the length indicator (LI) field in particular are as described in 3GPP TS 25.322 V3.5.0 (200-12),$3^{rd}$ Generation Partnership Project; Technical Specification Group Radio Access Network; RLC Protocol Specification (Release 1999).

Traditionally, the contents of the Header Extension Type (HE) field (a two bit field) indicates only whether the next octet will be a data octet, or an octet which includes a length indicator and an E bit. In accordance with the present invention, on the other hand, the Header Extension Type (HE) field can instead include a value which indicates that the port-specific sequence numbers are carried in the extension of a length indicator field of the header of the RLC protocol data unit, thereby distinguishing the inventive RLC PDU of the present invention over prior art PDUs which do not contain the port-specific sequence numbers. The predetermined value of the Header Extension Type (HE) field so used to signify the inclusion of port-specific sequence numbers can be one of the reserved values for Header Extension Type (HE) field. (the values utilized in the prior art being only 00 and 01).

FIG. 3A illustrates the contents of a RLC PDU of the present invention having the format of FIG. 3 and including four SDUs. The length of each of the SDUs mapped into the payload of the RLC PDU of FIG. 3A happens to be twenty octets each. The first octet pair formed by the third and fourth octets of FIG. 3A concerns the first SDU (SDU1) of the RLC PDU of FIG. 3A, with the length indicator (LI1) field for SDU1 pointing out that the end of SDU1 occurs twenty octets after the header, with the fourth octet of the PDU (the second octet of the first octet pair) providing the port-specific sequence count value for SDU1. The second octet pair formed by the fifth and sixth octets of FIG. 3A concerns the second SDU (SDU2) of the RLC PDU of FIG. 3A, with the length indicator (LI1) field for SDU2 pointing out that the end of SDU2 occurs forty octets after the header. The sixth octet of the PDU (the second octet of the second octet pair) providing the port-specific sequence count value for SDU2. Similarly, an octet pair is provided for each of the third SDU (SDU3) and the fourth SDU (SDU4).

On its receiving side, the radio link control (RLC) entity 200 implements and maintains a differentiated buffering technique for the plural TCP connections. The differentiated buffering technique involves differentiating between Internet Protocol (IP) packets in accordance with TCP port identifiers carried in the Internet Protocol (IP) packets to form TCP-specific subsets of Internet Protocol (IP) packets. In the embodiment illustrated in FIG. 2, the differentiated buffering technique is implemented by per-connection delivery organizer 250. The differentiated buffering technique involves the port & sequence checker unit 252 of per-connection delivery organizer 250 storing the TCP-specific subsets of Internet Protocol (IP) packets of the plural TCP connections in respective ones of the plural port-specific reordering buffers 258. Within each TCP-specific subset stored in a respective one of the port-specific reordering buffers 258, the port & sequence checker unit 252 orders the Internet Protocol (IP) packets in accordance with the port-specific sequence numbers carried in the RLC protocol data units. For a particular TCP connection, the SDU delivery function 256 delivers (to the Internet Protocol (IP) layer) Internet Protocol (IP) packets belonging to that particular TCP connection which become in-sequence upon arrival of a most recent Internet Protocol (IP) packet belonging to the given TCP connection.

FIG. 4B shows certain basic steps or operations performed by the receiving side of the radio link control (RLC) entity 200 of FIG. 2 upon reception of a RLC PDU from the lower layer (e.g., from the MAC layer). In fact, step 4B-1 depicts reception of an incoming RLC PDU from the lower layer. After reception and certain other processing, the received RLC PDU is stored in a common buffer, e.g., common receiver buffer 236. The contents of common receiver buffer 236 are monitored (step 4B-3) to determined when all segments of an IP packet have arrived (since, e.g., an IP packet may be segmented into more than one RLC PDU). After all segments of an IP packet have arrived, the IP packet is reassembled by reassembly function 242. Moreover, the port number for a completed IP packet is obtained from the header of the IP packet (step 4B-4), Step 4B-5 involves per-connection delivery organizer 250 checking whether the port number for the just-completed IP packet is a new port number. Detection of a new port indicates a new TCP connection. If a new port number is detected, as step 4B-6 the per-connection delivery organizer 250 allocates a new one of the port-specific reordering buffers 258 for the new TCP connection. Moreover, at step 4B-7 a timer is also allocated for the new TCP connection.

Whether the port number for the completed IP packet is new or not, at step 4B-8 the per-connection delivery organizer 250 resets the timer for the TCP connection associated with the port number. Then, the port & sequence checker unit 252 of per-connection delivery organizer 250 moves the entire IP packet to the appropriate one of the port-specific reordering buffers 258. Into which of the port-specific reordering buffers 258 the complete IP Packet is moved depends on the port number in the header of the IP packet. The port & sequence checker unit 252 positions the just-completed IP packet within the appropriate port-specific reordering buffer 258 in accordance with the port-specific sequence counter value obtained from the octet pair of the RLC PDU header corresponding to the SDU in which the IP packet was contained. Then, as step 4B-10, the SDU delivery function 256 delivers to the upper layer (e.g., Internet Protocol (IP) layer 104 in FIG. 1) on line 260 the IP packets which become in-sequence for the TCP connection due to the arrival of the just-completed IP packet.

An example scenario of delivery of IP packets by radio link control (RLC) entity 200 to an upper layer is illustrated by the sequence of FIGS. 5A–FIG. 5D. FIGS. 5A–FIG. 5D each represent consecutive or sequential depictions of a same one of the port-specific reordering buffers 258. The illustrated port-specific reordering buffer $258_X$ of FIGS. 5A–FIG. 5D has been properly opened for a new TCP connection, and it is assumed for sake of illustration that the first seven IP packets belonging to the TCP connection have already been read out of port-specific reordering buffer $258_X$. FIG. 5A shows by arrow 5A-1 entry of another IP packet into port-specific reordering buffer $258_X$, and particularly an IP packet from an SDU having a port-specific sequence counter value (SCV) of 9. The IP packet having SCV=9 is stored in an appropriate location in port-specific reordering buffer $258_X$ in view of its particular SCV (=9). The IP packet having SCV=9 cannot yet be read out of port-specific reordering buffer $258_X$, since in-sequence delivery is required and an IP packet with SCV=8 has not yet been stored in port-specific reordering buffer $258_X$. Subsequently, as shown by arrow 5B-1 in FIG. 5B, another IP packet (from an SDU having a port-specific sequence counter value (SCV) of 10) is entered into port-specific reordering buffer $258_X$. Neither the IP Packet with SCV=9 nor the IP packet with SCV=10 can yet be read out of port-specific reordering buffers 258, in view of the lack of the IP packet with SCV=8. Next, as shown by arrow 5C-1 in FIG. 5C, yet another IP packet (from an SDU having a port-specific sequence counter value (SCV) of 12) is entered into port-specific reordering buffer $258_X$, but entry of this IP packet also does not result in any delivery or readout. Finally, as shown by arrow 5D-1 in FIG. 5D, the IP packet for this TCP connection from a SDU having the port-specific sequence counter value (SCV) of 8 is received and stored in port-specific reordering buffers 258. Upon the per-connection delivery organizer 250 realizing that receipt of this last IP packet (with SCV=8) renders in-sequence each of the IP packets having SCV=8, 9, and 10, the IP packets having SCV=8, 9, and 10 are read out of port-specific reordering buffer $258_X$ by SDU delivery function 256 (as indicated by the arrow labeled "DELIVER" in FIG. 5D). The IP packet having the port-specific sequence counter value (SCV) of 12 likewise cannot be read out until the IP packet having the port-specific sequence counter value (SCV) of 11 is fully received, and so on.

Step 4B-11 of FIG. 4B reflects the fact that the receiving side of radio link control (RLC) entity 200, and particularly per-connection delivery organizer controller 254, periodically checks the timers associated with the respective TCP connections for which buffers 258 are currently allocated. As in the case of the timers on the sending side, such a time out presumptively indicates that the TCP connection has been terminated. In case any timer associated with the TCP connections has expired, as step 4B-12 the particular port-specific reordering buffer 258 and timer associated with that presumptively terminated TCP connection are de-allocated (and the timer previously assigned for that TCP connection is reset). Symbol 4B-13 depicts completion of basic operations of the receiving side of radio link control (RLC) entity 200 relative to receipt of a RLC PDU from the lower layer.

Ordinarily, radio link control (RLC) entities are paired in operation, with one radio link control (RLC) entity being situated in a node of the radio access network and another radio link control (RLC) entity being situated in a user equipment unit (UE) which communicates across the radio interface with a node of the radio access network. In one illustrated embodiment, the node of the radio access network in which the entity resides is a radio network control (RNC) node of the radio access network.

Figure 6:
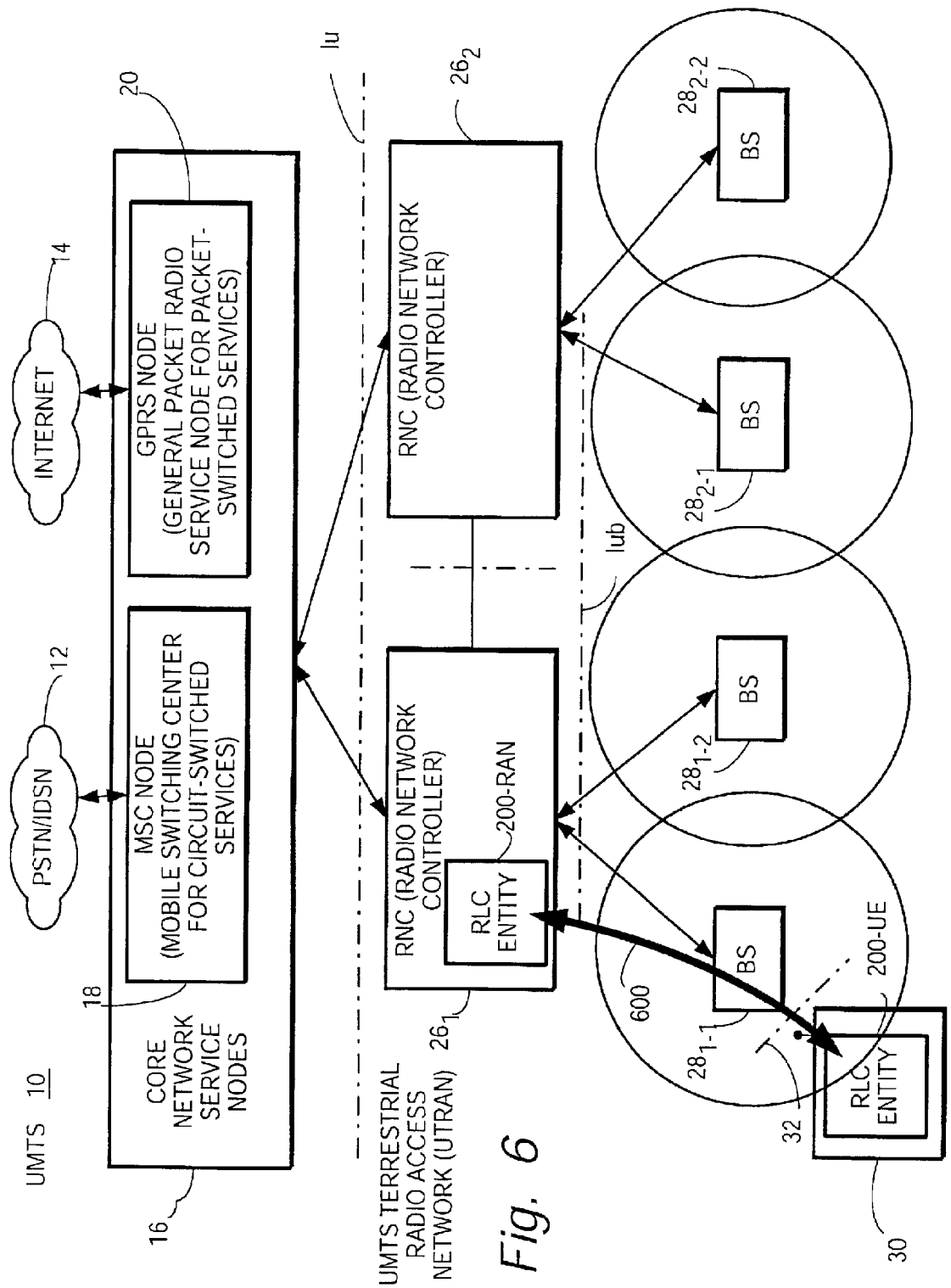
FIG. 6 is diagrammatic view of example mobile communications system in which the present invention may be advantageously employed.

The radio access network embodiment alluded to above is now described in the non-limiting, example context of a universal mobile telecommunications (UMTS) 10 shown in FIG. 6. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 6 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 6 shows that an RNC can be connected over an Iur interface to one or more other RNCs in the URAN 24. Further, it will be appreciated by those skilled in the art that base station nodes have, in some contexts, more recently become known as Node B or B-nodes.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 6, communicates with one or more cells or one or more base stations (BS) 28 over a radio or air interface 32. Each of the radio interface 32, the Iu interface, the Iub interface, and the Iur interface are shown by dash-dotted lines in FIG. 6.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Figure 7:
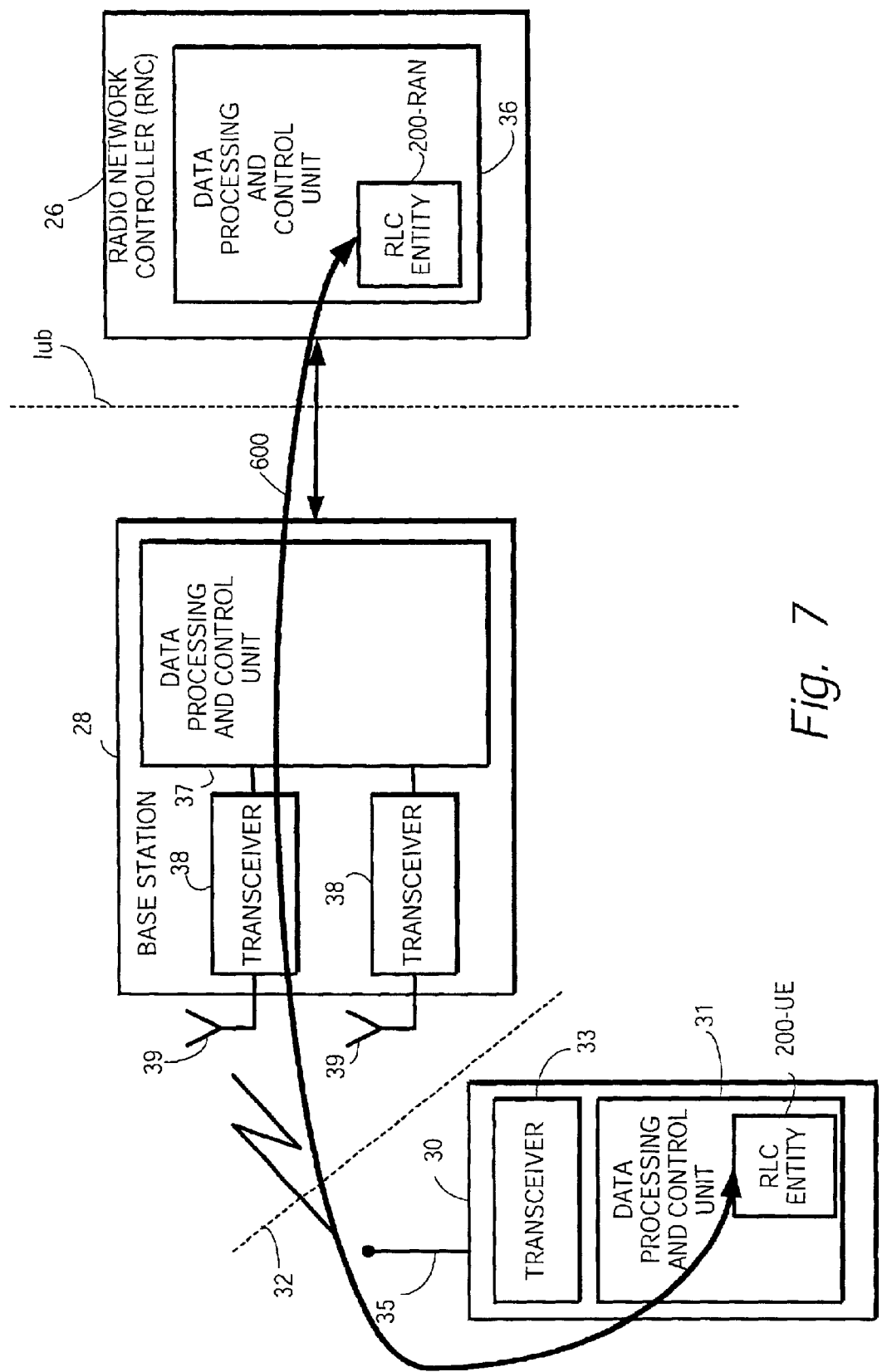
FIG. 7 is a simplified function block diagram of a portion of a UMTS Terrestrial Radio Access Network, including a user equipment unit (UE) station; a radio network controller; and a base station.

FIG. 7 shows selected general aspects of user equipment unit (UE) 30 and illustrative nodes such as radio network controller 26 and base station 28. The user equipment unit (UE) 30 shown in FIG. 7 includes a data processing and control unit 31 for controlling various operations required by the user equipment unit (UE). The UE's data processing and control unit 31 provides control signals as well as data to a radio transceiver 33 connected to an antenna 35. The radio transceiver 33 is a function of the physical layer.

The example radio network controller 26 and base station 28 as shown in FIG. 7 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In the example of FIG. 6 and FIG. 7, one RLC entity of an entity pair is situated in the serving radio network controller (SRNC) $26_1$ (i.e., radio link control (RLC) entity 200-RAN) while another RLC entity of the entity pair is situated in mobile station (MS) 30 (i.e., radio link control (RLC) entity 200-UE). Transmission of the RLC PDUs between radio link control (RLC) entity 200-UE and radio link control (RLC) entity 200-RAN is depicted by double-headed arrow 600 in FIG. 6 and FIG. 7.

While the radio link control (RLC) entity 200-RAN and radio link control (RLC) entity 200-UE are shown in FIG. 6 and FIG. 7 as being realized in the respective data processing and control units, it should be understood that the functionalities of radio link control (RLC) entity 200 can be provided in various ways. For example, the functions of a radio link control (RLC) entity 200 may be implemented using individual hardware circuits, using software functioning in conjunction with a suitably programmed digital microprocessor or general purpose computer, using an application specific integrated circuit (ASIC), and/or using one or more digital signal processors (DSPs).

Thus, in accordance with the present invention, the receiving side of the radio link control (RLC) entity 200 maintains the sequence of the IP packets for each TCP connection separately, e.g., using per-connection delivery organizer 250. In this way, the loss of one segment belonging to a given TCP connection can not block the delivery of packets belonging to another parallel TCP connection. In order to facilitate such separate (e.g., per-TCP port) in-sequence requirement, the sending side of the radio link control (RLC) entity 200 examines the headers of the incoming IP packets, and ascertains the port number (which identifies the TCP connection). A new sequence number counter is allocated for every port number (that has not been seen before by the sender). Upon segmentation, the current value of the corresponding counter is attached to the header of the first segment of the IP packet and the counter is incremented by one.

In the receiver entity, on the other hand, the RLC segments of the not completely arrived IP packets are collected in a common buffer. When an IP packet can be reassembled (because all of its segments have arrived), its port number (that identifies the connection) is read from its IP header. The IP packet is moved to a separate reordering buffer, dedicated to that port number. A new reordering buffer is allocated for every port number that has not been seen before by the receiver. Using the sequence number stores in the header of the RLC PDU carrying the first segment of the IP packet, the position (local for the TCP connection) of the IP packet is determined and the packet is put to the appropriate place of the buffer. Those IP packets that became in-sequence due to the arrival of this packet are delivered immediately and removed from the dedicated reordering buffer. Those IP packets whose port number can not be identified in the RLC for some reasons (e.g., if it is cyphered) are treated as if they would be coming from a common "invalid" port number.

By differentiating between parallel TCP connections, the present invention can achieve lower IP packet delay. The consequence is that the application level throughput and the utilization of the radio bearer increases. The solution also decreases the burstiness of the TCP/IP traffic that loads the core and the access network. This is a desirable impact from the aspect of network performance.

Several investigations were performed to determine how much improvement in the end-to-end application level performance could be achieved by using the radio link control (RLC) entity 200 of the present invention and the inventive modification in the RLC protocol. The investigation were limited to the high bitrate bearer (bearer capacity of 384 Kpbs), since this is the case when the packet order can fall out of the sequence with high probability. The investigations involved a simulation scenario which was defined as follows:

MAC Transition Time Interval (TTI): 10 ms

MAC frame size: 480 octets

One way delay of MAC frames between RLC entities: 50 ms

Block Error Rate of RLC PDUs 10% (uncorrelated)

RLC PDU size: 38 octets payload+2 octets header (+2 octet LI, if needed)

Status Prohibit Interval 100 ms

TCP Maximum Segment Size (MSS): 512 byte

TCP Receiver and Sender Buffer Size: 64 Kbyte

Varied parameters in the simulation were as follows:

Packet loss in Internet: {0%; 1%}

Files transferred with TCP: {3×10 Kbyte; 5×20 Kbyte; 2×100 Kbyte}

Table 1 summarizes the results (that are calculated as the average application level throughput in Kbit/sec of high number of measurements) for the different scenarios. In Table 1, the row marked "Old" represents the prior art, while the row marked "New" reflects implementation of the present invention.

TABLE 1

Average application level throughput [Kbit/sec] and relative improvement due to the per TCP in-order delivery.

| | Packet Loss in Internet 0% | | | | Packet Loss in Internet 1% | | | |
|---|---|---|---|---|---|---|---|---|
| | 2x10k | 5x10k | 10x10k | 2x100k | 2x10k | 5x10k | 10x10k | 2x100k |
| Old | 52 | 78 | 143 | 130 | 43 | 72 | 110 | 93 |
| New | 60 | 96 | 177 | 138 | 46 | 85 | 140 | 113 |
| Improv. | 15% | 23% | 23% | 6% | 7% | 18% | 27% | 21% |

Figure 8:
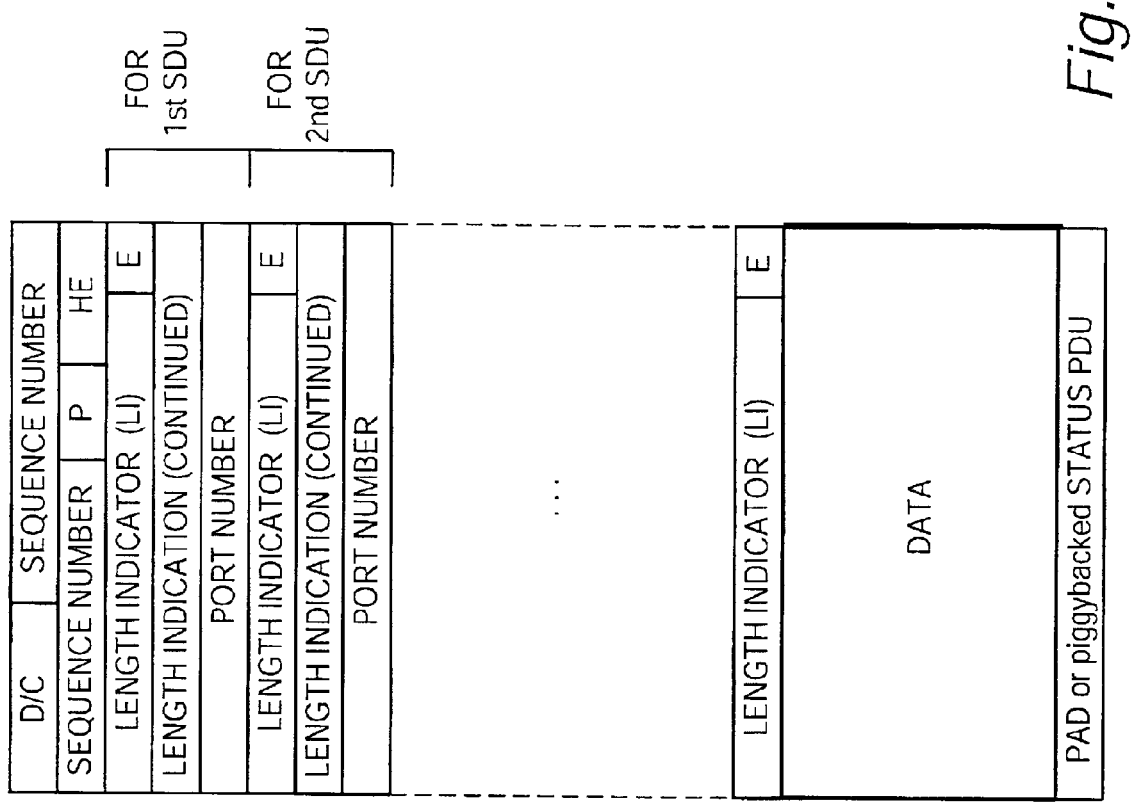
FIG. 8 is diagrammatic view of a second example format of a radio link control (RLC) protocol data unit (PDU) prepared and/or processed by the radio link control (RLC) entity of FIG. 2.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, FIG. 8 shows a further embodiment with a RLC PDU having a variant format from that of FIG. 3. In the header of the RLC PDU format of FIG. 8, an octet triplet is associated with each SDU of the payload, with the last octet of the octet triplet for an SDU being the port-specific sequence counter value for that SDU (rather than the second octet). Thus, the format of FIG. 8 caters to a situation in which other values or other extended field lengths are included in the header, such as a second octet for expressing the length indicator (LI) field, for example.

What is claimed is:

1. A radio access network which supports plural TCP connections across a radio interface with a user equipment unit (UE), the radio access network comprising:

at least one base station node which communicates across the radio interface with the user equipment unit (UE);

a radio network control node (RNC) connected to the base station node for controlling the base station node;

a radio link control (RLC) entity which processes RLC protocol data units obtained from a medium access control (MAC) layer to obtain Internet Protocol (IP) packets for the plural TCP connections, and which uses availability of Internet Protocol (IP) packets for a given TCP connection to control separately for the given TCP connection in-sequence delivery to an Internet Protocol layer of Internet Protocol (IP) packets without regard to availability of Internet Protocol (IP) packets of another of the plural TCP connections.

2. The apparatus of claim 1, wherein, to control in-sequence delivery of the Internet Protocol (IP) packets for the given TCP connection, the radio link control (RLC) entity uses port-specific sequence numbers in the RLC protocol data units which carry the Internet Protocol (IP) packets for the given TCP connection.

3. The apparatus of claim 2, wherein the port-specific sequence numbers are carried in an extension of a length indicator field of a header of the RLC protocol data units.

4. The apparatus of claim 3, wherein a predetermined value in a header extension type field of the header of the RLC protocol data units indicates that the port-specific sequence numbers are carried in an extension of a length indicator field of the header of the RLC protocol data units.

5. The apparatus of claim 2, wherein the radio link control (RLC) entity maintains a differentiated buffering technique for the plural TCP connections, the differentiated buffering technique involving differentiating between Internet Protocol (IP) packets in accordance with TCP port identifiers carried in the Internet Protocol (IP) packets to form TCP-specific subsets of Internet Protocol (IP) packets.

6. The apparatus of claim 5, wherein the differentiated buffering technique involves storing the TCP-specific subsets of Internet Protocol (IP) packets of the plural TCP connections in respective plural buffers.

7. The apparatus of claim 5, wherein within each TCP-specific subset the radio link control (RLC) entity orders the Internet Protocol (IP) packets in accordance with the port-specific sequence numbers carried in the RLC protocol data units.

8. The apparatus of claim 7, wherein for the given TCP connection the radio link control (RLC) entity delivers to the Internet Protocol (IP) layer Internet Protocol (IP) packets belonging to the given TCP connection which become in-sequence upon arrival of a most recent Internet Protocol (IP) packet belonging to the given TCP connection.

9. The apparatus of claim 1, wherein upon obtaining a received Internet Protocol (IP) packet from the Internet Protocol layer for the given TCP connection, the radio link control (RLC) entity updates a port-specific sequence number counter associated with the given TCP connection and includes an updated value of the port-specific sequence number counter along with the received Internet Protocol (IP) packet in a RLC protocol data unit prepared by the radio link control (RLC) entity for transmission to the medium access control (MAC) layer.

10. The apparatus of claim 9, wherein the updated value of the port-specific sequence number counter is carried in an extension of a length indicator field of a header of the RLC protocol data units.

11. The apparatus of claim 10, wherein a predetermined value in a header extension type field of the header of the RLC protocol data units indicates that the updated value of the port-specific sequence number is carried in an extension of a length indicator field of the header of the RLC protocol data units.

12. The apparatus of claim 1, wherein the radio link control (RLC) entity is situated in a node of the radio access network.

13. The apparatus of claim 12, wherein the radio link control (RLC) entity is situated in the radio network control (RNC) node of the radio access network.

14. A radio link control (RLC) entity for use with or in a radio access network and which supports plural TCP connections across a radio interface, the radio link control (RLC) entity processing RLC protocol data units obtained from a medium access control (MAC) layer to obtain Internet Protocol (IP) packets for the plural TCP connections, and using availability of Internet Protocol (IP) packets for a given TCP connection to control separately for the given TCP connection in-sequence delivery to an Internet Protocol layer of Internet Protocol (IP) packets without regard to availability of Internet Protocol (IP) packets of another of the plural TCP connections.

15. The apparatus of claim 14, wherein, to control in-sequence delivery of the Internet Protocol (IP) packets for the given TCP connection, the radio link control (RLC) entity uses port-specific sequence numbers in the RLC protocol data units which carry the Internet Protocol (IP) packets for the given TCP connection.

16. The apparatus of claim 15, wherein the port-specific sequence numbers are carried in an extension of a length indicator field of a header of the RLC protocol data units.

17. The apparatus of claim 16, wherein a predetermined value in a header extension type field of the header of the RLC protocol data units indicates that the port-specific sequence numbers are carried in an extension of a length indicator field of the header of the RLC protocol data units.

18. The apparatus of claim 15, wherein the radio link control (RLC) entity maintains a differentiated buffering technique for the plural TCP connections, the differentiated buffering technique involving differentiating between Internet Protocol (IP) packets in accordance with TCP port identifiers carried in the Internet Protocol (IP) packets to form TCP-specific subsets of Internet Protocol (IP) packets.

19. The apparatus of claim 18, wherein the differentiated buffering technique involves storing the TCP-specific subsets of Internet Protocol (IP) packets of the plural TCP connections in respective plural buffers.

20. The apparatus of claim 18, wherein within each TCP-specific subset the radio link control (RLC) entity orders the Internet Protocol (IP) packets in accordance with the port-specific sequence numbers carried in the RLC protocol data units.

21. The apparatus of claim 20, wherein for the given TCP connection the radio link control (RLC) entity delivers to the Internet Protocol (IP) layer Internet Protocol (IP) packets belonging to the given TCP connection which become in-sequence upon arrival of a most recent Internet Protocol (IP) packet belonging to the given TCP connection.

22. The apparatus of claim 14, wherein upon obtaining a received Internet Protocol (IP) packet from the Internet Protocol layer for the given TCP connection, the radio link control (RLC) entity updates a port-specific sequence number counter associated with the given TCP connection and includes an updated value of the port-specific sequence number counter along with the received Internet Protocol (IP) packet in a RLC protocol data unit prepared by the radio link control (RLC) entity for transmission to the medium access control (MAC) layer.

23. The apparatus of claim 22, wherein the updated value of the port-specific sequence number counter is carried in an extension of a length indicator field of a header of the RLC protocol data units.

24. The apparatus of claim 23, wherein a predetermined value in a header extension type field of the header of the RLC protocol data units indicates that the updated value of the port-specific sequence number is carried in an extension of a length indicator field of the header of the RLC protocol data units.

25. The apparatus of claim 14, wherein the radio link control (RLC) entity is situated in a node of the radio access network.

26. The apparatus of claim 14, wherein the radio link control (RLC) entity is situated in a radio network control (RNC) node of the radio access network.

27. The apparatus of claim 14, wherein the radio link control (RLC) entity is situated in a user equipment unit (UE) which communicates across the radio interface with a node of the radio access network.

28. A user equipment unit (UE) which communicates across a radio interface with a node of a radio access network, the user equipment unit (UE) comprising:
a receiver/transmitter which operates in a physical layer;
a radio link control (RLC) entity which supports plural TCP connections across a radio interface, the radio link control (RLC) entity processing RLC protocol data units obtained from the medium access control (MAC) layer to obtain Internet Protocol (IP) packets for the plural TCP connections, and using availability of Internet Protocol (IP) packets for a given TCP connection to control separately for the given TCP connection in-sequence delivery to an Internet Protocol layer of Internet Protocol (IP) packets without regard to availability of Internet Protocol (IP) packets of another of the plural TCP connections.

29. The apparatus of claim 28, wherein, to control in-sequence delivery of the Internet Protocol (IP) packets for the given TCP connection, the radio link control (RLC) entity uses port-specific sequence numbers in the RLC protocol data units which carry the Internet Protocol (IP) packets for the given TCP connection.

30. The apparatus of claim 29, wherein the port-specific sequence numbers are carried in an extension of a length indicator field of a header of the RLC protocol data units.

31. The apparatus of claim 30, wherein a predetermined value in a header extension type field of the header of the RLC protocol data units indicates that the port-specific sequence numbers are carried in an extension of a length indicator field of the header of the RLC protocol data units.

32. The apparatus of claim 29, wherein the radio link control (RLC) entity maintains a differentiated buffering technique for the plural TCP connections, the differentiated buffering technique involving differentiating between Internet Protocol (IP) packets in accordance with TCP port identifiers carried in the Internet Protocol (IP) packets to form TCP-specific subsets of Internet Protocol (IP) packets.

33. The apparatus of claim 32, wherein the differentiated buffering technique involves storing the TCP-specific subsets of Internet Protocol (IP) packets of the plural TCP connections in respective plural buffers.

34. The apparatus of claim 32, wherein within each TCP-specific subset the radio link control (RLC) entity orders the Internet Protocol (IP) packets in accordance with the port-specific sequence numbers carried in the RLC protocol data units.

35. The apparatus of claim 34, wherein for the given TCP connection the radio link control (RLC) entity delivers to the Internet Protocol (IP) layer Internet Protocol (IP) packets belonging to the given TCP connection which become in-sequence upon arrival of a most recent Internet Protocol (IP) packet belonging to the given TCP connection.

36. The apparatus of claim 28, wherein upon obtaining a received Internet Protocol (IP) packet from the Internet Protocol layer for the given TCP connection, the radio link control (RLC) entity updates a port-specific sequence number counter associated with the given TCP connection and includes an updated value of the port-specific sequence number counter along with the received Internet Protocol (IP) packet in a RLC protocol data unit prepared by the radio link control (RLC) entity for transmission to the medium access control (MAC) layer.

37. The apparatus of claim 36, wherein the updated value of the port-specific sequence number counter is carried in an extension of a length indicator field of a header of the RLC protocol data units.

38. The apparatus of claim 37, wherein a predetermined value in a header extension type field of the header of the RLC protocol data units indicates that the updated value of the port-specific sequence number is carried in an extension of a length indicator field of the header of the RLC protocol data units.

39. A method of handling plural TCP connections existing across a radio interface, the method comprising:

processing RLC protocol data units obtained from a medium access control (MAC) layer to obtain Internet Protocol (IP) packets for the plural TCP connections;

using availability of Internet Protocol (IP) packets for a given TCP connection to control separately for the given TCP connection in-sequence delivery to an Internet Protocol layer of Internet Protocol (IP) packets without regard to availability of Internet Protocol (IP) packets of another of the plural TCP connections.

40. The method of claim 39, wherein, to control in-sequence delivery of the Internet Protocol (IP) packets for the given TCP connection, the method further comprises using port-specific sequence numbers in the RLC protocol data units which carry the Internet Protocol (IP) packets for the given TCP connection.

41. The method of claim 40, wherein the port-specific sequence numbers are carried in an extension of a length indicator field of a header of the RLC protocol data units.

42. The method of claim 41, wherein a predetermined value in a header extension type field of the header of the RLC protocol data units indicates that the port-specific sequence numbers are carried in an extension of a length indicator field of the header of the RLC protocol data units.

43. The method of claim 40, further comprising maintaining a differentiated buffering technique for the plural TCP connections, the differentiated buffering technique involving differentiating between Internet Protocol (IP) packets in accordance with TCP port identifiers carried in the Internet Protocol (IP) packets to form TCP-specific subsets of Internet Protocol (IP) packets.

44. The method of claim 43, wherein the differentiated buffering technique comprises storing the TCP-specific subsets of Internet Protocol (IP) packets of the plural TCP connections in respective plural buffers.

45. The method of claim 43, further comprising ordering within each TCP-specific subset the Internet Protocol (IP) packets in accordance with the port-specific sequence numbers carried in the RLC protocol data units.

46. The method of claim 45, further comprising for the given TCP connection delivering, to the Internet Protocol (IP) layer, Internet Protocol (IP) packets belonging to the given TCP connection which become in-sequence upon arrival of a most recent Internet Protocol (IP) packet belonging to the given TCP connection.

47. The method of claim 39, wherein upon obtaining a received Internet Protocol (IP) packet from the Internet Protocol layer for the given TCP connection, the method further comprises updating a port-specific sequence number counter associated with the given TCP connection and includes an updated value of the port-specific sequence number counter along with the received Internet Protocol (IP) packet in a RLC protocol data unit prepared by the radio link control (RLC) entity for transmission to the medium access control (MAC) layer.

48. The method of claim 47, further comprising carrying the updated value of the port-specific sequence number counter in an extension of a length indicator field of a header of the RLC protocol data units.

49. The method of claim 48, further comprising using a predetermined value in a header extension type field of the header of the RLC protocol data units to indicate that the updated value of the port-specific sequence number is carried in an extension of a length indicator field of the header of the RLC protocol data units.

* * * * *